March 28, 1967 J. E. BLANCH ETAL 3,311,448
CONTINUOUS CRYSTALLIZATION OF ALKALI METAL
ALUMINUM ACID ORTHOPHOSPHATES
Filed Nov. 1, 1962

INVENTORS
JULIAN E. BLANCH
GEORGE I. KLEIN
LEO B. POST
BY Louis F. Kline, Jr. THEIR AGENT

3,311,448
CONTINUOUS CRYSTALLIZATION OF ALKALI METAL ALUMINUM ACID ORTHOPHOSPHATES

Julian E. Blanch, Tinley Park, Leo B. Post, Chicago, and George I. Klein, Park Forest, Ill., assignors to Stauffer Chemical Company, New York, N.Y., a corporation of Delaware
Filed Nov. 1, 1962, Ser. No. 234,773
4 Claims. (Cl. 23—105)

This invention relates to a continuous process for preparing complex crystalline alkali metal aluminum acid orthophosphates of the general formula:

$$M_xAl_yH_z(PO_4)_8 \cdot O\text{-}5H_2O$$

where M is an alkali metal selected from the group consisting of sodium, potassium and mixtures thereof, and $x$, $y$, and $z$ are numbers of from 1 to 15, 2 to 4, and 0 to 15, respectively, with the sum of $x+3y+z$ equal to 24, and the improved crystalline alkali metal aluminum acid orthophosphates resulting therefrom.

Crystalline alkali metal aluminum acid orthophosphates and, in particular, sodium aluminum acid orthophosphates, are largely old compounds which have come into widespread use in recent years in the baking art where they serve as the acid-reacting components in leavened baked goods. Since their inception, the alkali metal aluminum acid orthophosphates (hereinafter alternatively denoted as SAP) have been produced commercially by what may be termed a "batch reaction process." By the batch reaction process, phosphoric acid is charged into an open vessel containing a low speed, high-torque agitator and heating jacket. The phosphoric acid is then heated to 75–115° C., with the agitator running, and a stoichiometric quantity of alkali metal and aluminum reactants are added. When the reactants are first added, the reaction mixture is a viscous suspension which gradually turns more viscous as water is permitted to escape until there is a final change of state with the mass formation of finely-divided SAP crystals. About 40 minutes are normally required from the time the reactants are added to the phosphoric acid until the crystalline product is fully formed. Significantly, at no point in the process does the reaction mixture approach a clear, solids-free solution.

Although the batch reaction process has been useful heretofore, it has labored under some important disadvantages. Among these, the most noteworthy is the unusual viscosity problem encountered; the batch material is normally too viscous to be pumped and only through the use of greatly oversized equipment can it be agitated satisfactorily. The high viscosities encountered in the production of sodium aluminum acid orthophosphates are difficult to express quantitatively since they are outside of the range of ordinary viscometers (perhaps in the range of 100,000 to 200,000 centipoises). Roughly, the viscosity of the phase present immediately before crystallization in the batch process is about equivalent to that exhibited by plastic asphalts (low-petroleum volatiles types).

Obviously, the batch process necessitated large and very expensive agitation equipment and furnished no in-process control of the crystallization step. Changes in viscosity during processing required that the agitators and motors be greatly oversized to meet the maximum load requirements encountered in the crystallization phase change (typically motor loads increased to about 600% of the initial value during crystallization). Even with the oversized agitation equipment, it was not uncommon for agitator, shafts, couplings, and linkages to shear when approaching the crystallization transition point. Further, because of inherent factors in the process, the crystallization transition could not be controlled to provide for the growth of crystals to larger, more desirable particles. Because of the in situ formation of crystals in the presence of unreacted material, and a liquid phase, the batch had to be agitated until only a crystalline phase remained. As a result of being produced by the batch reaction process, crystalline alkali metal aluminum acid orthophosphates produced heretofore have assumed the form of small clusters or agglomerates of indistinct shape and having somewhat less than ideal physical and baking characteristics.

We have now discovered that alkali metal aluminum acid orthophosphate may be prepared by a continuous crystallization process employing separate zones for reaction and crystallization. By this process, the alkali metal and aluminum reactants are added to phosphoric acid in what may be termed an agitated "reaction zone" and retained in said zone in a conveyable liquid state until reaction is substantially complete. Thereafter, the liquid reaction mixture from the reaction zone is passed continuously into what may be termed an agitated "crystallization zone" wherein free water is driven off at elevated temperatures. In a preferred embodiment, the reaction mixture is prepared batch-wise in the reaction zone and fed continuously to the crystallization zone. In the crystallization zone, a pre-established bed of crystalline alkali metal aluminum acid orthophosphate of substantially the same stoichiometric proportions of alkali metal, aluminum, and phosphorus as the incoming liquid reaction mixture must be maintained at all times. This pre-established bed serves to promote crystallization by providing nuclei upon which the incoming SAP feed may crystallize. By such seeded crystallization, it has been found that alkali metal aluminum acid orthophosphate may be prepared in the form of larger, more desirable crystalline particles.

In addition to the pre-established bed, the crystallization zone must provide a kneading-conveying type of agitation whereby incoming liquid feed is quickly kneaded into the dough-like bed of SAP and slowly conveyed therewith away from the point of entry. This kneading-conveying action makes possible continuous crystallization. As the SAP feed passes through the crystallization zone, which is maintained at elevated temperatures, it is concentrated by the removal of free water, tending to crystallize on the seed particles of the pre-established bed.

The term "free water" used herein is intended to describe the water present in the reaction mixture in excess of water of constitution and crystal water, both of which may be required in the molecule of the particular alkali metal aluminum acid orthophosphate being produced. The finished SAP product will normally contain less than 1% and preferably less than 0.3% free water.

An important feature of the novel process is the finding that it is possible to produce and maintain the alkali metal aluminum acid orthophosphate reaction mixtures in a liquid, conveyable state. Obviously, the liquid reaction mixture must be capable of being pumped (if not sufficiently free-flowing to allow gravity flow) to the crystallization zone. In this regard, it has been found that a conveyable solution may be produced if the total free water content of the reaction mixture is held between about 14% and 25% by weight of the reaction mixture. However, a pumpable liquid SAP reaction mixture may also be attained with as little as 9.5% and as much as 44% by weight free water. In the case of the more concentrated reaction mixtures, however, a problem of control exists since the temperature must be rather high to keep the mixture fluid. When held at such elevated temperatures, a liquid reaction mixture containing less than 14% by weight free water is highly susceptible to losing water and "freezing" as a solid mass of SAP. On the other hand, a reaction mixture containing relatively high amounts of free water is undesirable by virtue of the fact that such water must essentially all be removed before the finely-divided crystalline product will result. Accordingly, it is preferred that the free water content be maintained between 14% and 25% and means be provided for retaining such water during any hold-up of the reaction mixture. The viscosities of such liquids have been found to be sufficiently low (usually within the range of 4000 to 24,000 centipoises) to permit comparatively easy handling with ordinary processing equipment.

As used herein, the term "reaction mixture" is intended to refer to the liquid resulting after the complete reaction between the alkali metal compound, the aluminum compound, and phosphoric acid. There is evidence that these reaction mixtures are not simply solutions of alkali metal aluminum acid orthophosphates, but rather complex mixtures of alkali metal and aluminum phosphates in water. In this regard, it is known that alkali metal aluminum acid orthophosphates are rather insoluble in water and, to the extent that they are soluble, they usually undergo incongruent solubility.

Apparatus suitable for practicing the novel process may be assembled from known processing equipment available heretofore. Ordinary vessels provided with agitators and heat transfer means may comprise the reaction zone. A preferred type of reaction vessel will also have some means for retaining and/or returning free water during any hold-up period. One particularly suitable reactor consists of an enclosed vessel vented through a reflux condenser to the atmosphere. As will be explained more fully hereinafter, water cannot always be added to the reaction mixture after dehydration has commenced, and, therefore, the reaction mixture is desirably maintained with about the same free water content as initially present. The crystallization zone will consist principally of a kneader-conveyor, usually of the design typified by the well-known Kneadermaster and Ko-kneader. The prime function of the kneader-conveyor is to serve as a crystallizer. It will consist of a horizontal trough in which is located an agitator and heat exchange means, e.g., a heating jacket. The unit may be enclosed and provided with means for sweeping heated air over the bed of SAP, or it may simply comprise an open trough. The liquid feed is normally supplied near one end of the kneader-conveyor trough and crystalline product removed from the other end. If desired, the product may be discharged from the trough containing between 0.5% and 2.0% free water which then may be removed in a conventional dryer, kiln, kiln mill, or the like.

Alkali metal aluminum acid orthophosphates, produced by the crystallization process herein disclosed, have improved physical and chemical properties. By this novel process, crystal growth is promoted yielding a product which is more distinctly crystalline. To illustrate, the tetrahydrate form of sodium aluminum acid orthophosphate, widely known commercially as "regular SAP" may be crystallized to yield large, distinct, flat hexagonal platelets, although these large particles of the "theoretical" form have not been obtainable heretofore by the batch reaction process. Although the batch reaction process has been capable of producing SAP of the same crystalline lattice (as shown by X-ray diffraction patterns) the process has tended to yield minute, agglomerated particles or clusters rather than distinct, hexagonal platelets. When subjected to comminution of a mild type to crush large lumps, this clustered or agglomerated SAP tends to fracture easily into very finely-divided particles or dust. By contrast, the "regular SAP" produced by the process herein described is in the form of mostly larger hexagonal particles which are not appreciably sub-divided by mild milling. These larger particles have been found to yield superior handling and chemical characteristics when used in food applications, and, in particular, when used as the acid-reacting agent for baked goods.

The observable differences between the crystal development of the batch reaction products and the products of continuous crystallization are illustrated in FIGURES 1 through 3, which are photomicrographs of sodium aluminum acid orthophosphate, tetrahydrate magnified approximately 140 times.

Figure 1:
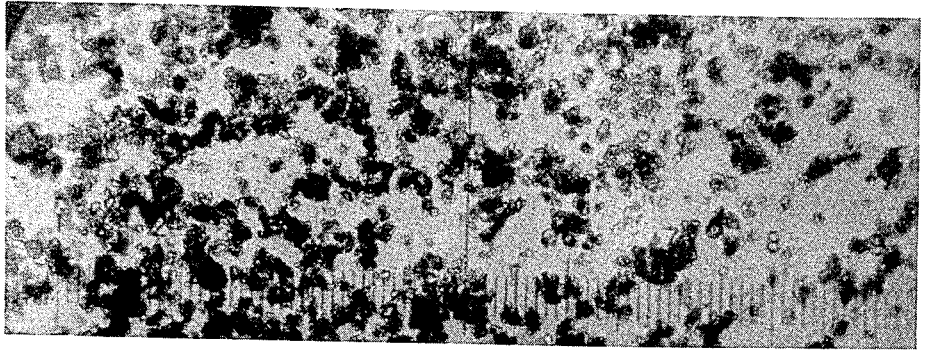
FIGURE 1 is a photomicrograph of material produced by the batch reaction method of the prior art (milled in an air-swept Raymond IMP pulverizer).
Figure 2:
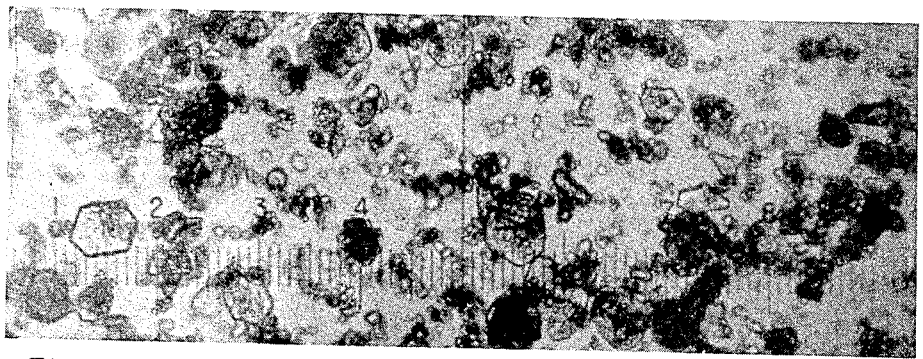
FIGURE 2 is a photomicrograph of material produced by the continuous crystallization process (milled in the same unit for the same time as the material of FIGURE 1).
Figure 3:
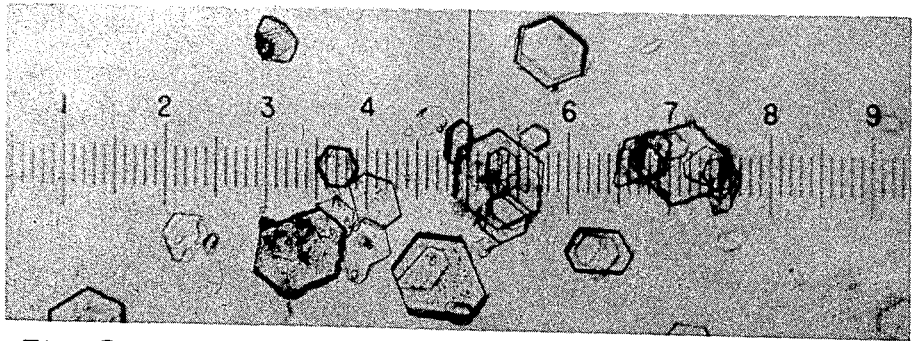
FIGURE 3 is a photomicrograph of slowly crystallized unmilled sodium aluminum acid orthophosphate, tetrahydrate.

From the photomicrographs it may be seen that sodium aluminum acid orthophosphate, tetrahydrate forms as distinct hexagonal platelets when slowly crystallized (FIGURE 3). When crystallized more rapidly by the inherently fast batch reaction process, this material forms ultra-fine particles, or agglomerates of the same, which do not have a distinct crystalline outline at the magnification shown (FIGURE 1). By comparison, the milled material produced by seeded crystallization contains a relatively large number of distinct particles (FIGURE 2). Whereas the batch produced SAP would normally have an A.P.D. (average particle diameter) within the range of 3.5 to 5.5 microns, the SAP produced by continuous crystallization normally has an A.P.D. of about 5.5 to 8.5 microns. It is significant to note that the A.P.D. values mentioned herein relate to alkali metal aluminum acid orthophosphates, all of which have been comminuted to remove large lumps. Consequently, the difference in particle size reflects a difference in crystal development rather than the degree of milling. Specific A.P.D. values are shown in the following table wherein each "composite" relates to a group of random samples taken during a single day's production.

*Table I.—Average particle diameters of SAP crystals*

| Batch reaction: | A.P.D.,[1] microns |
|---|---|
| Composite 1 | 4.0 |
| Composite 2 | 5.2 |
| Composite 3 | 4.8 |
| Composite 4 | 4.8 |
| Continuous crystallization: | |
| Composite 1 | 6.8 |
| Composite 2 | 6.6 |
| Composite 3 | 5.6 |
| Composite 4 | 6.8 |

[1] Determined by Fisher sub-sieve sizer.

One important advantage of the continuously crystallized SAP is its free-flowing quality. Today, a major proportion of the SAP produced is used as the leavening acid in dry prepared baking mixes and/or self-rising flour mixes. When employed in such use, SAP is blended mechanically with the flour, salt, bicarbonate of soda, and other dry ingredients. Unfortunately, SAP is a somewhat hygroscopic material which tends to cake upon exposure to atmospheric moisture. Consequently, in the continuous blending equipment it is not unusual for the batch-produced SAP to cause bridging or cavitation in the feed hoppers. The more free-flowing SAP produced by the continuous crystallization process substantially obviates this difficulty. The flowability of dry particulate solids may be characterized by what will be termed, for convenience herein, the "funnel flow test." By this test, two funnels having four inch diameter cones are mounted on a ring stand, one above the other, with the bottom tip of the stem of the top funnel approximately one inch from the cone of the bottom funnel and the stem of the bottom funnel stoppered. Funnels having 60° cones, ⅝ inch diameter stems, and ¾ inch long stems are used. In testing for flowability, 100 grams of the test sample is poured into the upper funnel and allowed to flow freely into the stoppered bottom funnel. After allowing about 30 seconds for entrapped air to escape from the material in the bottom funnel, the stopper is removed and the time required for the sample to pass out of the bottom funnel is recorded. Flowability is measured as the amount of time for the standard weight of samples to pass out of the bottom funnel. For materials which tend to cake and will not flow freely out of the bottom funnel, this funnel may be tapped or agitated in some way to promote flow. For a more extensive treatment of the technique of measuring flowability, reference is made to Cerial Science Today, vol. 5, September 1960, pages 198–201. By the "funnel flow test" SAP produced by the continuous crystallization method requires a flow time of not more than 40 seconds, while batch-produced SAP normally requires more than 50 seconds. A typical sample of continuously crystallized SAP will require about 30 seconds, while the batch crystallized material takes about 60 seconds.

Other advantages of the continuously crystalized SAP include decreased hygroscopicity, more uniformity in baking operations, and improved baking characteristics. Although these features are mainly qualitative in nature, they provide significant improvements over the batch-produced SAP available heretofore.

The starting reactants of our process are the same as those employed heretofore in the preparation of SAP. As used herein, the term "alkali metal" is intended to refer to sodium and potassium. Further, the term "alkali metal compound," as defining reactants which may be used by our process, is limited, as far as the sodium compounds are concerned, to sodium carbonate and sodium hydroxide. The potassium compounds included within this definition consist of those compounds which have either organic or inorganic anions and which will ionize in either organic or inorganic solvents to furnish a free and available potassium cation. Some suitable potassium compounds with inorganic anions include potassium hydroxide, potassium oxide, potassium carbonate, potassium bicarbonate, potassium nitrate, potassium sulfate, monopotassium orthophosphate, dipotassium orthophosphate, tripotassium orthophosphate, potassium chloride, potassium bromide, potassium iodide, and potassium fluoride. Among these, the oxide, hydroxide, carbonate, and nitrate are to be preferred. The suitable organic-anion compounds include, for example, potassium tartrate, potassium acid tartrate, potassium acid phthalate and potassium acetate. The reactive trivalent aluminum compounds intended to be included as starting reactants are aluminum oxide and hydroxide (hydrated alumina), but the hydroxide is preferred because of its higher reactivity. Any phosphoric acid which comprises the orthophosphate ion ($PO_4^\equiv$), or which hydrolyzes to form such ion, is a suitable acid starting material. Orthophosphoric acid ($H_3PO_4$) is, however, to be preferred.

The proportions of the alkali metal and aluminum compounds and the phosphoric acid used as starting reactants are those required to furnish stoichiometric ratios of sodium aluminum and phosphorus corresponding to the desired end product. For example, to produce the tetrahydrate form of SAP, proportions will be selected to furnish an Na:Al:P ratio of about 1:3:8. An example reaction according to the process is illustrated by the following equation wherein sodium carbonate and aluminum hydroxide are selected as reactants:

$$Na_2CO_3 + 6Al(OH)_3 + 16H_3PO_4 \rightarrow 2NaAl_3H_{14}(PO_4)_8 \cdot 4H_2O + CO_2 + 11H_2O$$

The above equation presents the over-all reaction in greatly simplified form and the exact course of the intermediate reactions and the intermediates formed are not fully understood at the present time. As previously mentioned, there is evidence that the liquid reaction mixture formed is a complex mixture of various sodium and aluminum phosphates. The complexity of the liquid reaction mixture may be illustrated by its characteristics when an attempt is made to dilute or concentrate the same. For example, if water is added to the reaction mixture after reaction has subsided, a precipitate may form and persist until (and probably through) crystallization. If reactants are selected to yield a reaction mixture initially containing more than 44% by weight of free water, it is virtually impossible to thereafter obtain a clear solution even if the mixture is boiled to give a free water content within the preferred range. The solids which form when concentrating the liquid do not appear to be undissolved $Al_2O_3 \cdot 3H_2O$ or $Na_2CO_3$, and under microscopic examination do not resemble any known form of SAP. Also, if the free water content of the liquid is permitted to decrease significantly after reaction is complete, e.g., if the total free water drops from 20% to 10% by weight, an equivalent amount of water cannot then be added back to the solution without adverse results. Such addition will cause the solution to become turbid and/or a precipitate will form, indicating the possible formation of a hydrolysis product such as hydrated aluminum phosphate or basic aluminum phosphate. Obviously, because of the unusual characteristics of the liquid reaction mixture, the free water content must be critically maintained within the required range. Fortunately, by holding the reaction mixture in an enclosed reactor fitted with a condenser, the free water content can be suitably controlled even under elevated temperatures.

The required free water content of the reaction mixture may be supplied by either of two basic methods. The preferred method is to select starting reactants which furnish the required free water content initially. For example, as illustrated in the equation supra, aluminum hydroxide may be used as a starting material to yield 11 moles of $H_2O$ for each 2 moles of tetrahydrate SAP. Additional free water may be supplied by selecting an aqueous phosphoric acid as a starting material. The alternative method is simply to add water to the reaction mixture, preferably before reaction is complete.

To prevent precipitation or "setting up" of the liquid reaction mixture, the reaction zone must be maintained at a temperature between about 40° C. and the boiling point of the reaction mixture (110–125° C. at STP) and preferably between about 75° C. and 108° C. The crystallization zone is maintained between about 60° C. and 200° C., preferably between about 80° C. and 170° C. However, a significant temperature gradient may exist in the crystallization zone whereby fresh feed entering may be heated at progressively higher temperatures during its sojourn therethrough. Above about 200° C., the various forms of SAP begin to decompose with the loss of water of constitution.

The maximum hold-up time of the reaction mixture in the reaction zone is essentially unlimited, provided that during hold-up the free water content is maintained within the required limitations. Normally, the reaction mixture may be prepared batch-wise from the starting materials in from 30 minutes to 8 hours, the exact time depending upon the size of the batch. By a variation described hereinafter, the reaction mixture may also be prepared continuously by a much faster method. The minimum retention time is that which will allow substantially complete reaction between the metal compounds and the phosphoric acid. The time of retention in the crystallization zone will be a function of the free water content of the reaction mixture feed and the degree of crystallinity desired in the final product. These factors will also be dependent to a large measure on the temperature of the bed maintained in the crystallization zone.

The following specific examples illustrate the process of the present invention:

EXAMPLE 1

To a large open reactor, fitted with a fan type agitator, were charged, in the following order, 3850 gallons of 80% orthophosphoric acid, 3300 lbs. of sodium carbonate, and 77 gallons of an aqueous 45% potassium hydroxide solution. The charge temperature rose from 30° C. to 70° C. during the sodium carbonate addition (accomplished over a period of about one hour). After reaction subsided, 1020 gallons of the resulting solution was pumped to a vessel fitted with an agitator, heating jacket and water-cooled reflux condenser. The treated acid was then heated to 95° C. (in three hours) and 3120 pounds of hydrated alumina was added over a three hour period. The charge was agitated for one additional hour and analyzed; a ratio of $P_2O_5:Al_2O_3$ of 3.76 was found (no correction in the charge ratio was required).

After analysis, the charge solution was held at 100° C. for 6.5 hours and cooled slowly to 70° C. in 4 hours. It was thereafter maintained under agitation at 70° C. while feeding intermittently for 168 hours to a Kneadermaster containing an agitated bed of crystalline tetrahydrate SAP (potassium treated). The Kneadermaster temperature (i.e., the jacket temperature) was maintained between about 120° C. and 160° C. by 78 p.s.i.g. steam in the jacket and the blade rotation was held at 18.3 r.p.m. Intermittent feeding was employed, and the actual feeding time was 39 hours and the production rate was 350 to 475 pounds per hour. Elemental analyses and X-ray powder diffraction patterns were made on random samples of the white crystalline Kneadermaster discharge. The product was thereby identified as essentially the tetrahydrate form of SAP shown herein in FIGURE 2 and having X-ray d-spacing of the lines of greatest intensity at 2.99, 3.67, and 8.70 angstroms.

EXAMPLE 2

By the procedure, and employing the apparatus described in Example 1, 3100 pounds of soda ash and 58 gallons of 45% KOH solution were added to 3500 gallons of 86% orthophosphoric acid. After reaction was completed, 1005 gallons of the resulting liquid reaction mixture was pumped to the reactor equipped with the reflux condenser. There the charge was heated to 95° C. in two hours and then 3520 pounds of hydrated alumina was added over a period of 3 hours. An additional 1 hour of heating furnished a solution having a $P_2O_5:Al_2O_3$ ratio of 3.69.

The charge was held at 100° C. for 5 hours, cooled to 70° C. in 2 hours, and fed (at 70° C.) to a Kneadermaster maintained at a blade rotation of 30 r.p.m. (temperatures same as Example 1) over a period of 20 hours. The product, produced at a rate of 650 to 800 pounds per hour, analyzed as essentially the tetrahydrate form of SAP.

EXAMPLE 3

By the procedure, and employing the apparatus described in Examples 1 and 2, the dehydrated form of SAP, was produced by controlling the Kneadermaster bed temperature to 160–200° C. and decreasing the blade rotation to about 9 r.p.m. Under such conditions it was possible to simultaneously remove both free water and crystal hydrate water from the feed material.

The terms "reaction zone" and "crystallization zone" are used herein to define conditions under which reacting and crystallizing SAP materials are maintained rather than to refer to physical locations or separate units of equipment. This distinction is made necessary by the large number of equivalent types of equipment and procedures which may be used to accomplish the steps of the novel process. Accordingly, a process employing the teachings herein will normally contain, in addition to the reactor vessels and kneader-conveyors described above, conduits, storage tanks, hoppers, redlers, dust collectors, fans, bins, mixers, mills, etc., all of which may be put to use by variations in the basic process which will be obvious to those skilled in the art. Furthermore, although it is preferable to crystallize in a kneader-conveyor apparatus of the type disclosed hereinbefore, crystallization may also be accomplished with other types of equipment such as fluidized beds, agitated rotary conveyors, and the like, if the same are designed to maintain a pre-established bed of SAP and suitable crystallization conditions. As disclosed above, where the reaction mixture is prepared batchwise, the preferred method for commercial production, separate reactor vessels are advantageously used for reacting the sodium compound and the aluminum compound. Using a multi-reactor system, phosphoric acid may be first reacted with the alkali metal compound, for example, sodium carbonate, in an open reactor, with the aluminum compound reacted in a second tank, preferably an enclosed tank containing a vent through an atmospheric condenser. The two vessels together comprise, in this instance, the reaction zone. Moreover, it is possible that the dehydration will comprise multiple units. For example, a kneader-conveyor may be used to receive the liquid reaction mixture which will be crystallized therein but not dried. The remaining free water may then be removed from the product in a second unit such as another kneader-conveyor, dryer, kiln mill, or the like. In preparing the dehydrated form of SAP, $NaAl_3H_{14}(PO_4)_8 \cdot 0\text{-}1H_2O$, the removal of hydrate water may also be accomplished in an after-heating step in apparatus such as rotary dryers, kilns, ovens, etc. Still another possible variation comprises reacting phosphoric acid with the aluminum reactant and then transporting the resulting liquid to a kneader-conveyor where the alkali metal reactant is metered into the feed stream. Under this procedure, the retention time in the kneader-conveyor must be adjusted to allow substantially complete reaction before crystallization begins. Under some circumstances, it may even be desirable to feed all of the reactants directly to the inlet of the kneader-conveyor. One significant advantage of these latter procedures is the full utilization of the heat of reaction.

Although the crystalline alkali metal aluminum acid orthophosphates are, as a group, old and well-known compounds, some new modifications thereof have been more recently discovered. These new modifications may also be prepared by the novel process disclosed herein since they exhibit like, if not identical, chemical states and undergo similar phase changes when crystallized from concentrated liquid reaction mixtures. Thus, in addition to the "regular SAP," $NaAl_3H_{14}(PO_4)_8 \cdot 4H_2O$, the dehydrated modification thereof $$NaAl_3H_{14}(PO_4)_8 \cdot 0\text{-}1H_2O$$

and their various potassium-containing modifications, the more recently developed forms of SAP of the formulas $Na_4Al_2H_{14}(PO_4)_8 \cdot H_2O$ (see copending U.S. patent application, Ser. No. 172,852, filed February 13, 1962); $Na_3Al_3H_{12}(PO_4)_8 \cdot 5H_2O$ (see copending U.S. patent application, Ser. No. 172,865, filed Feb. 13, 1962);

$$Na_3Al_2H_{15}(PO_4)_8 \cdot 2H_2O$$

(see copending U.S. patent application, Ser. No. 173,054, filed Feb. 13, 1962); and $NaAl_3K_nH_{14-n}(PO_4)_8 \cdot 4H_2O$, where $n = 0.38$ to 14, inclusive (see copending U.S. patent application, Ser. No. 148,332, filed Oct. 30, 1961) are among the products of the novel process disclosed. Accordingly, the above-mentioned copending applications are hereby incorporated herein by reference.

The foregoing description is given for clearness of understanding only, and no unecessary limitations should be understood therefrom, as modifications will be obvious to those skilled in the art.

We claim:
1. A process for preparing a complex crystalline alkali metal aluminum acid orthophosphate of the formula:

$$M_xAl_yH_z(PO_4)_8 \cdot C\text{-}5H_2O$$

wherein M is an alkali metal selected from the group consisting of sodium and potassium and mixtures thereof and $x$, $y$, and $z$ are numbers of from 1 to 15, 2 to 4, and 0 to 15, respectively, with the sum of $x+3y+z$ equal to 24, which comprises:
  (A) preparing a conveyable liquid reaction mixture containing alkali metal, aluminum, and phosphorous constituents in substantially stoichiometric proportions within the above formula and a free water content between 9.5% and 44% by weight of said liquid reaction mixture which comprises reacting a reactive trivalent aluminum compound and at least one alkali metal compound with phosphoric acid in an agitated reaction zone maintained between 40° C. and the boiling temperature of said liquid reaction mixture;
  (B) retaining said liquid reaction mixture in said reaction zone until reaction is substantially complete;
  (C) passing said liquid reaction mixture into an agitated crystallization zone comprising a pre-established bed of crystalline alkali metal aluminum acid orthophosphate of like composition maintained between 60° C. and 200° C. whereupon said liquid reaction mixture crystallizes; and
  (D) recovering crystalline alkali metal aluminum acid orthophosphate from said crystallization zone.

2. A process for preparing $$NaAl_3H_{14}(PO_4)_8 \cdot 4H_2O$$

which comprises:
  (A) preparing a conveyable liquid reaction mixture containing one gram atom of sodium and three gram atoms of aluminum for each eight gram atoms of phosphorous and a free water content between 14% and 25% by weight of said liquid reaction mixture which comprises reacting a sodium compound selected from the group consisting of sodium carbonate and sodium hydroxide and an aluminum compound selected from the group consisting of aluminum oxide and aluminum hydroxide with orthophosphoric acid in an agitated reaction zone maintained between 40° C. and the boiling temperature of said liquid reaction mixture;
  (B) retaining said liquid reaction mixture in said reaction zone until reaction is substantially complete;
  (C) passing said liquid reaction mixture into an agitated crystallization zone comprising a pre-established bed of $NaAl_3H_{14}(PO_4)_8 \cdot 4H_2O$ maintained between 60° C. and 200° C. whereupon said liquid reaction mixture crystallizes; and
  (D) recovering crystalline sodium aluminum acid orthophosphate from said crystallization zone.

3. The improved alkali metal aluminum acid orthophosphate produced by the process of claim 1.

4. The improved sodium aluminum acid orthophosphate produced by the process of claim 2.

References Cited by the Examiner
UNITED STATES PATENTS

| | | | |
|---|---|---|---|
| 2,550,490 | 4/1951 | McDonald | 23—107 |
| 2,995,421 | 8/1961 | Dyer | 23—105 |
| 3,041,177 | 6/1962 | Lauck | 99—95 |

OSCAR R. VERTIZ, *Primary Examiner.*

O. F. CRUTCHFIEELD, *Assistant Examiner.*